(12) United States Patent
Larsson et al.

(10) Patent No.: US 6,490,254 B1
(45) Date of Patent: Dec. 3, 2002

(54) PACKET LOSS TOLERANT RESHAPING METHOD

(75) Inventors: Mikael Larsson, Sollentuna (SE); Peter Larsson, Singapore (SG); Per Ljunggren, Alingsis (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/346,300

(22) Filed: Jul. 2, 1999

(51) Int. Cl.$^7$ .................................................. H04J 1/16
(52) U.S. Cl. ...................................... 370/252; 370/233
(58) Field of Search .............................. 370/252, 395.2, 370/395.21, 232, 233

(56) References Cited

U.S. PATENT DOCUMENTS 6,304,551 B1 * 10/2001 Ramamurthy et al. ...... 370/252

FOREIGN PATENT DOCUMENTS

WO WO 01/03382 * 1/2001 .................. 370/252

OTHER PUBLICATIONS

Atsushi Ohta, Takatoshi Sugiyama, Fusao Nuno, Masafumo Yoshioka, Akira Jozuko and Yuichi Sagawa, "Technologies for ATM Interface of Prototype ATM Wireless Access Equipment", Sep. 1998, pp. 120–126.

Pierre E. Boyer, Michel J. Servel and Fabrice P. Guillemin, "The Spacer–Controller: An Efficient UPC/NPC for ATM Networks", Oct. 1992, pp. 316–320.

Jungtae Lee, Kyohong Jin, Seunghyun Park, "A Compemsation Method of Cell Delay Variation in the ATM Networks", Apr. 1995, pp. 72–76.

European Search Report dated Aug. 20, 1999.

* cited by examiner

*Primary Examiner*—Salvatore Cangialosi

(57) ABSTRACT

A reshaper is provided in a DLC (Data Link Control) layer of a WLAN (Wireless Local Area Network) system. The system can be configured to support various link and network protocols such as ATM (Asnynchronous Transfer Mode), Ethernet and IP (Internet Protocol). The DLC reshaper overcomes time distortion of a stream of packets or cells that is introduced as the stream passes through the WATM, by restoring or maintaining proper time intervals between packets or cells in a stream. Thus, an output stream of packets or cells from the DLC reshaper is not slipped or shifted in phase, and does not include jitters. The DLC reshaper uses ARQ (Automatic Repeat Request) sequence numbers of the packets or cells to detect when one or more packets are discarded or lost. The DLC reshaper can determine time intervals for packets or cells in a stream based on a PCR (Peak Cell Rate) for the connection that is being supported, and ARQ sequence numbers of the packets or cells. The DLC reshaper can also determine specific transmission times for the packets or cells in the stream, based on the PCR, the ARQ sequence numbers, and a reference time such as a transmission time of a first packet or cell.

14 Claims, 6 Drawing Sheets

PACKET LOSS TOLERANT RESHAPING METHOD

BACKGROUND OF THE INVENTION

1. Field of the Invention

The invention relates generally to the field of telecommunications, and specifically to reshaping streams of data packets or cells in a communications network.

2. Background Information

FIG. 7 shows a DLC (Data Link Control) layer and other protocol layers in an exemplary conventional system having a laptop computer communicating with a server via a wireless link between the laptop computer and an AP (Access Point), and an Internet connection between the server and an IP router connected to the AP.

In a WLAN (Wireless Local Area Network) that has a DLC (Data Link Control) layer and uses a TDMA (Time Division Multiple Access) TDD (Time Division Duplexing) frame structure and a packet-oriented delivery technique, the DLC layer can clump or bunch together data packets or cells in a stream of packets, and thus alter a timing of the stream. For example, the clumping or bunching changes time intervals between adjacent packets or cells in a stream. Most real time applications are designed for a fixed network, where packets are expected to arrive with a fairly constant rate that is lower than, or equal to, a peak PR (Packet Rate). To ensure that such real time applications work properly in the WLAN, a need exists for a reshaper to compensate for the clumping introduced by the DLC layer. The clumping can be compensated for by, for example, restoring a time interval or distance between consecutive packets in the stream before delivering the packets to the network layer.

A fixed ATM (Asynchronous Transfer Mode) network and a prototype WATM (Wireless ATM) network are examples of networks that employ reshapers. Conceptually, any packet-and connection-oriented network that supports real-time connections may need reshapers.

In a fixed ATM network, reshaping is performed to restore traffic characteristics of connections. Connection traffic characteristics can generally be expressed in the form of a PCR (Peak Cell Rate), an MCR (Mean Cell Rate) and a CDV (Cell Delay Variation), or variation in a time interval between adjacent cells or packets in a stream or sequence. Due to multiplexing in the ATM network, the traffic characteristics of a connection can be distorted. For instance, ATM cells or packets can be clumped together in time, resulting in a PCR that is too high and/or a CDV that is too large.

In most situations an ATM reshaper is used on interfaces between ATM networks that are managed by different operators, or in other words on inter-carrier interfaces. ATM reshapers can also optionally be used on other interfaces.

An alternative term for an ATM reshaper is "cell spacer", which describes the function of the reshaper. The ATM reshaper ensures that an amount of time between two consecutive cells or packets is always equal to, or longer, than an amount of time 1/PCR. For a VBR (Variable Bit Rate) connection, the ATM reshaper also monitors the MCR (Mean Cell Rate), but for the sake of simplicity let us consider a CBR (Constant Bit Rate) connection.

FIG. 1 shows an example where an ATM reshaper 105 is used in an ATM network 102 that provides a CBR transport service between first and second end terminals 101 and 104. The first end terminal 101 is a source of cells or packets, and the second end terminal 103 is a sink or destination for the cells or packets sourced. by the first end terminal 101. As shown in FIG. 1, the first end terminal 101 provides a stream of cells or packets to a first portion 104 of the ATM network. The first portion 104 of the ATM network processes the cells or packets and then forwards them to the ATM reshaper 105, but with an altered time spacing or time interval between the cells or packets. The reshaper receives the altered stream of cells or packets from the first portion 104 of the ATM network, and "reshapes" or restores the proper time intervals between the cells or packets before forwarding them to the second end terminal 103.

FIG. 2 further illustrates how the ATM reshaper 105 supports the CBR connection. The CBR source or end terminal 101 forwards ATM cells or packets to the ATM network 102 with an agreed upon PCR, +/− some accepted CDV. As mentioned above, when ATM cells or packets are processed in an ATM network a time spacing or interval between the cells or packets can be altered, so that the ATM cells or packets become clumped together in time, even so close that ATM cells are sent out from the ATM network back to back with no time interval between them. This can occur, for example, due to buffering in the ATM network. The reshaper 105 reshapes the output of the ATM network portion 104 to ensure that the traffic characteristics of cells or packets output from the ATM network 102 comply with the ATM traffic contract when the cells or packets are forwarded to the CBR sink, or second end terminal 103. In accordance with the traffic contract, the output of the reshaper is allowed to have some CDV. This means that the time between two consecutive cells is allowed to be slightly less than T seconds, where T=1/PCR. FIG. 2 shows a very fortunate case, where the ATM reshaper 105 perfectly manages to restore the time intervals of the original cell stream as output by the first end terminal 101 or CBR source.

As shown in FIG. 2, the output S1 of the first end terminal 101 or CBR source features cells or packets P1–P7, evenly spaced in time by a time interval T=1/PCR. When this stream of cells is output from the first portion 104 of the ATM network 102 as the output S2, it has a different spacing. For example, as can be seen in FIG. 2, P2 is located very close to P3, P6 is located very close to P7, and the interval between P4 and P6 is significantly larger than T. The output stream S2 from the first portion 104 of the ATM network 102 is provided to the ATM reshaper 105, which reshapes the stream to have the original spacing of S1, and outputs the reshaped stream as the output S3. The output S3 has a time spacing that is equal to T=1/PCR, within the allowed CDV.

When the connection supported by the ATM network 102 is a VBR connection, the reshaper 105 also ensures that a mean bandwidth of the connection also complies with the ATM traffic contract. In other words, the smallest time interval between two consecutive cells or packets will still be 1/PCR (plus or minus an allowed CDV), but the time interval can also be much longer when necessary to prevent the mean bandwidth from being exceeded.

Reshaping can also be necessary in a WATM network. The DLC framing and the ARQ (Automatic Repeat Request) function in a WATM network will cause clumping of packets when the WATM network transports cells or packets to an ATM application. Since the ATM application expects the traffic characteristics of the connection to be in accordance with an ATM traffic contract governing the connection the WATM network is supporting, this clumping needs to be compensated for. By including a reshaper in a terminal through which the WATM network communicates with the ATM application, packet clumping introduced by the DLC Layer in the WATM network when transporting packets in downlink to the terminal can be smoothed out or reshaped, before the packets are forwarded to the ATM application.

A reshaper may also be required in a BS (Base Station) or AP (Access Point) to the WATM network, in order to smooth out the packet clumping introduced by the DLC layer in uplink. If the WATM network enforces the connections it is supporting with a UPC (Usage Parameter Control) function, then the BS will need to reshape streams of cells or packets being transported by and through the connections, because the WATM network will discard packets that violate the traffic contract. In addition, cell or packet streams being transported by uplink connections are not reshaped, it might be difficult for the CAC (Connection Admission Control) algorithm in the WATM network to statistically estimate the traffic load in the network, since the DLC layer has distorted the original traffic characteristics.

In the AWA (ATM Wireless Access) system, reshaping is implemented by time stamping packets. Upon arrival at a transmitter in the AWA, a packet is time stamped. The time stamp and the packet are then sent together by the transmitter to a receiver over an air interface. The receiver preserves time intervals between consecutive or adjacent packets by determining a proper time interval between two consecutive packets using a difference between the time stamps of the two consecutive packets, and then forwarding the packets with the proper interval. In other words, the receiver forwards two consecutive packets using a time interval that is the same as indicated by the difference in their time stamps.

It is also possible to configure an application such as a Codec or a network protocol such as RTP (Real Time Protocol) to perform any necessary reshaping itself. The transmitter side can include a time stamp in every packet (for example, where the packets contain speech samples), which the receiver side can make use of to restore an original time interval between packets.

However, techniques use a timestamp, requires the transmitter to add time stamp information (for example, 2 octets worth) to every packet transmitted over the air interface, which consumes additional bandwidth. In addition, the AWA reshaper only smooths out the delay variation introduced by the DLC layer. The AWA reshaper does not compensate for delay variation introduced by the ATM core network in downlink.

Moreover, ATM reshapers in general are intolerant to packet losses. When a packet is lost, an ATM reshaper may not recognize that the packet is lost and consequently mistake a next following packet for the lost packet. In this situation, the ATM reshaper may send out the next following packet too early, and thus change a "phase" of the stream of packets output from the reshaper, and/or cause "jitters" or variation in the output stream. This situation is illustrated in FIG. 4.

As shown in FIG. 4, the stream S41 represents a stream of packets P1–P7 output by an ATM CBR source. In the stream S41, the packets P1–P7 are separated by a time interval T that is equal to 1/PCR within a specified CDV, where PCR is the peak cell rate for the connection. The stream S41 is provided to an ATM network, which outputs a corresponding stream of packets S42. As shown, the ATM network discards the packet P2, and it is not included in the stream S42. This causes the reshaper to interrupt transmission and wait until the next packet arrives. When the packet P3 arrives, a time since the first packet P1 was transmitted is larger than 1/PCR, and accordingly the reshaper immediately forwards the third packet, packet P3. The ATM reshaper has no mechanism by which to determine whether the packet it just received is the third packet P3 arriving on time, or is the second packet P2 arriving delayed. Consequently, as indicated in the cell stream S43 output from the reshaper, the packet P3 is transmitted earlier than intended, so that a time interval between the transmissions of the packets P3 and P4 from the ATM reshaper is longer than 1/PCR. This can cause further jitters in the cell stream S43.

FIG. 5 depicts another case where an ATM reshaper is provided a cell stream S52 from which a packet P2 has been lost. As shown in FIG. 5, an ATM CBR source outputs a packet stream S51 containing packets P1–P7 separated by an interval T=1/PCR. As can be seen from the packet stream S52 output by an ATM (or a WATM) network, the ATM network discards the packet P2. The ATM network happens to clump the first three packets P1, P2 and P3 so that in the packet stream S52 the packets P1 and P3 are close together. In the situation shown in FIG. 5, the packets P1 and P3 in the stream S52 are close enough together that the reshaper mistakenly identifies the packet P3 as the packet P2, and forwards it so that in the packet stream S53 output from the reshaper the packets P1 and P3 are separated by an improper interval of 1/PCR seconds, instead of a proper interval of 2/PCR seconds. Then, the time interval between P3 and P4 in the stream S53 is much longer than 1/PCR seconds.

A packet stream free of jitters due to packet loss can be necessary or desirable in some applications, for example in an application providing a synchronous service. Maintaining original time intervals between packets in a stream, even when a packet is lost, can also be necessary or desirable. For example, maintaining an original distance of 2/PCR seconds between the packets P1 and P3 can be particularly desirable when a Codec is used. If the Codec is aware of a packet loss it can repeat the last packet (or generate background noise) to fill in for the lost packet, and thereby avoid unnecessary "slip" or change in phase of the stream. For example, when a speech sample is lost, a GSM Codec will repeat a speech sample preceding the lost speech sample, as a normal countermeasure.

SUMMARY OF THE INVENTION

In accordance with exemplary embodiments of the invention, a reshaper is provided in the DLC layer. The DLC reshaper restores or maintains proper time intervals between packets or cells in a stream, and overcomes disadvantages of conventional reshapers by efficiently and effectively detecting and handling situations where one or more packets are lost or discarded. Thus, an output stream of packets or cells from the DLC reshaper is not slipped or shifted in phase, and does not include jitters.

In accordance with exemplary embodiments of the invention, the DLC reshaper uses ARQ sequence numbers to detect when one or more packets are discarded or lost. In accordance with exemplary embodiments of the invention, the DLC reshaper determines time intervals for packets or cells in a stream based on a PCR for the connection that is being supported, and ARQ sequence numbers of the packets or cells. The DLC reshaper can also determine specific transmission times for the packets or cells in the stream, based on the PCR, the ARQ sequence numbers, and a reference time such as a transmission time of a first packet or cell.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein.

DETAILED DESCRIPTION OF THE PREFERRED EMBODIMENTS

In accordance with exemplary embodiments of the invention, a DLC reshaper makes use of ARQ sequence numbers to discover a possible packet loss. For example, the DLC reshaper can inspect the ARQ sequence numbers of packets it receives. When the ARQ sequence numbers of adjacent packets received by the DLC reshaper do not have consecutive ARQ sequence numbers, the DLC reshaper knows that one or more packets between the two received adjacent packets, corresponding to the missing ARQ sequence numbers, are missing or have been discarded.

Figure 1:
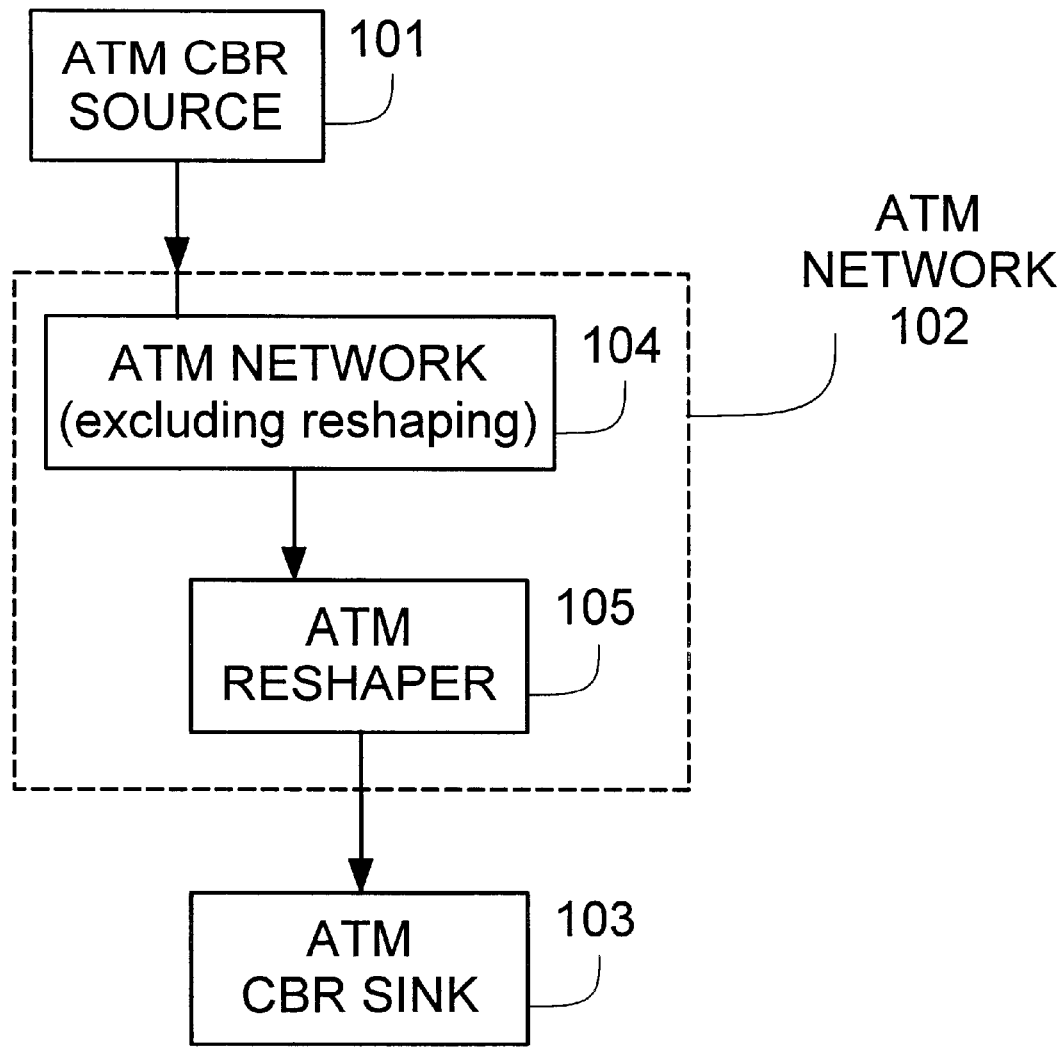
FIG. 1 shows an example of an ATM network with a conventional ATM reshaper.
Figure 2:
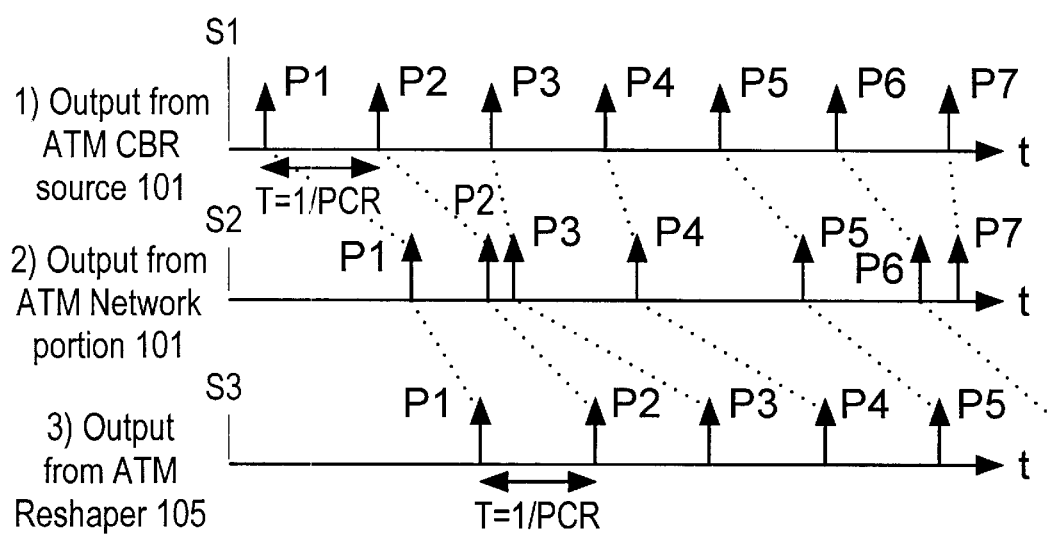
FIG. 2 shows functional results when the ATM reshaper of FIG. 1 is used.
Figure 3:
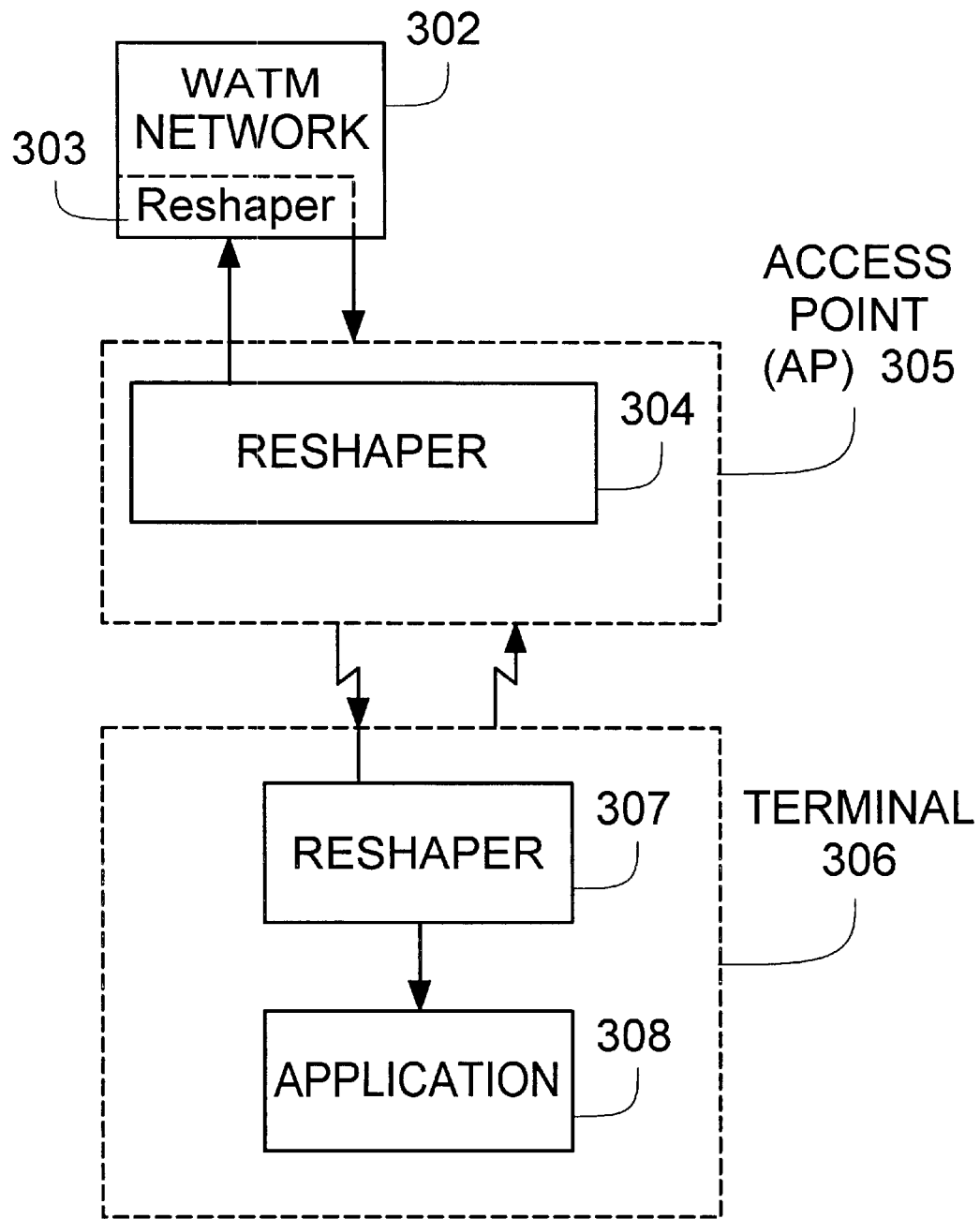
FIG. 3 shows a DLC reshaper in a WATM network in accordance with exemplary embodiments of the invention.
Figure 4:
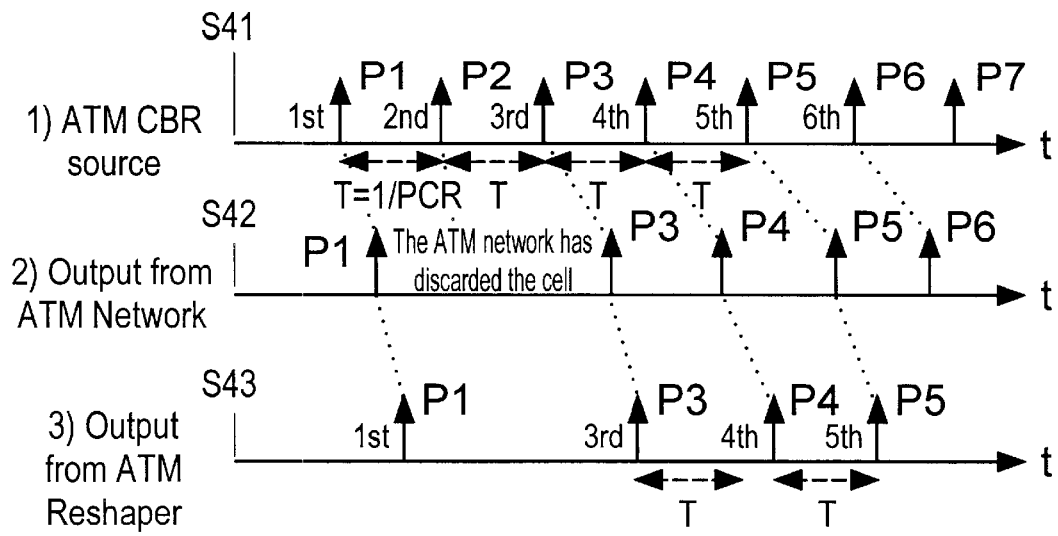
FIG. 4 shows how packet losses can result in jitter when a conventional ATM reshaper is used.

In accordance with exemplary embodiments of the invention and as shown in FIG. 3, a DLC reshaper can be located, for example, in a receiving side of a DLC layer in a WATM network 302. For example, a DLC reshaper 303 can be located within the WATM network 302, and/or a DLC reshaper 304 can be located within an AP 305 connected to, or part of, the WATM network 302. A DLC reshaper 307 can also be located in a terminal 306, as illustrated in FIG. 3, to reshape a packet stream from the WATM network 302 and provide the reshaped stream to an application 308 in the terminal 306.

The DLC reshaper can easily calculate a transmission time for a packet based on a reference time, a PCR for the connection being supported, and on an ARQ sequence number of the packet. The "transmission time" refers to a time when the DLC reshaper should transmit or output the packet, so that a stream of packets output from the DLC reshaper has a proper phase and proper time intervals between packets in the stream. With respect to the reference time, if a first packet is sent out at a time $t_0$, then the time $t_0$ can be used, for example, as the reference time. Alternatively, any appropriate reference time can be used. For example, any known transmission time of a packet in the stream can be used. The known transmission time can be in the past, or in the future.

When the time $t_0$ is used as the reference time and an n:th packet subsequent to the first packet is to be transmitted from the DLC reshaper, a proper transmission time for the n:th packet can be defined as $t_0+n/PCR$, which equals $t_0+n*T$ where $T=1/PCR$. This relationship can also be expressed as:

$$t_n = t_k + (n-k)*T,$$

where $t_n$ is the delivery or transmission time of a packet having an ARQ sequence number n, and k is an ARQ sequence number of a last delivered packet. Thus, the DLC reshaper ensures that the time interval between two consecutive delivered packets having ARQ sequence numbers k and n is equal to $(n-k)*T$. If the DLC reshaper finishes determining the time $t_n$ at an actual time (t) happens to be later than the value $t_n$, or if in other words the time $t_n$ is in the past, then the DLC immediately delivers the packet. Otherwise, the DLC reshaper waits until the present time t is equal to $t_n$ before delivering the packet having the ARQ sequence number n.

Figure 5:
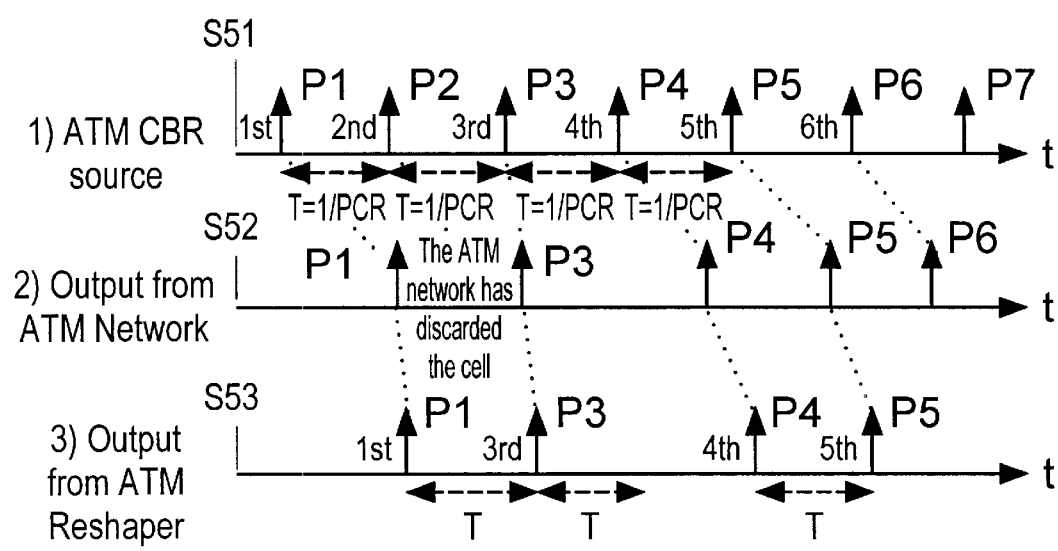
FIG. 5 shows how packet losses can result in slip or phase change in a stream of packets when a conventional reshaper is used.
Figure 6:
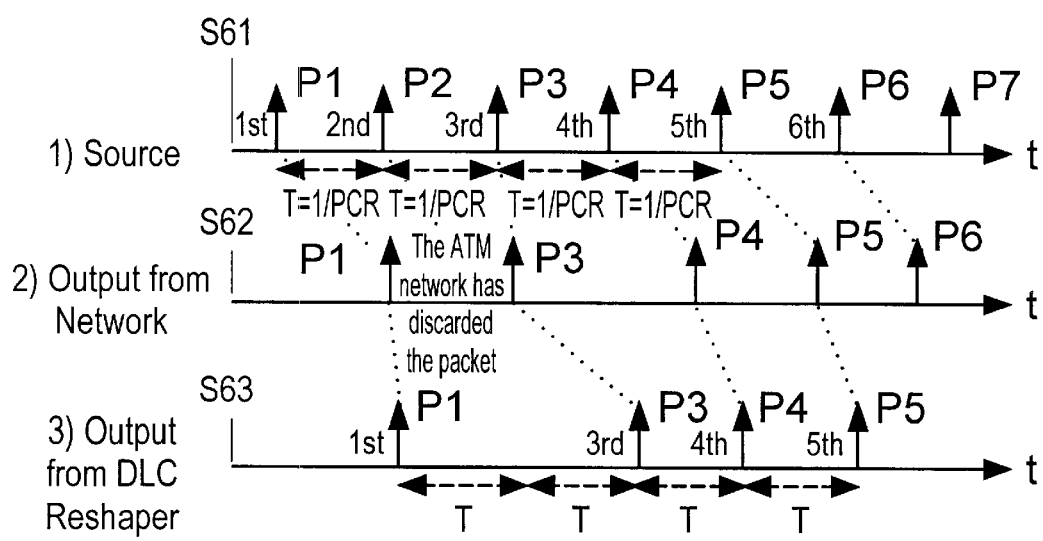
FIG. 6 shows functional results when a reshaper in accordance with exemplary embodiments of the invention is used.
Figure 7:
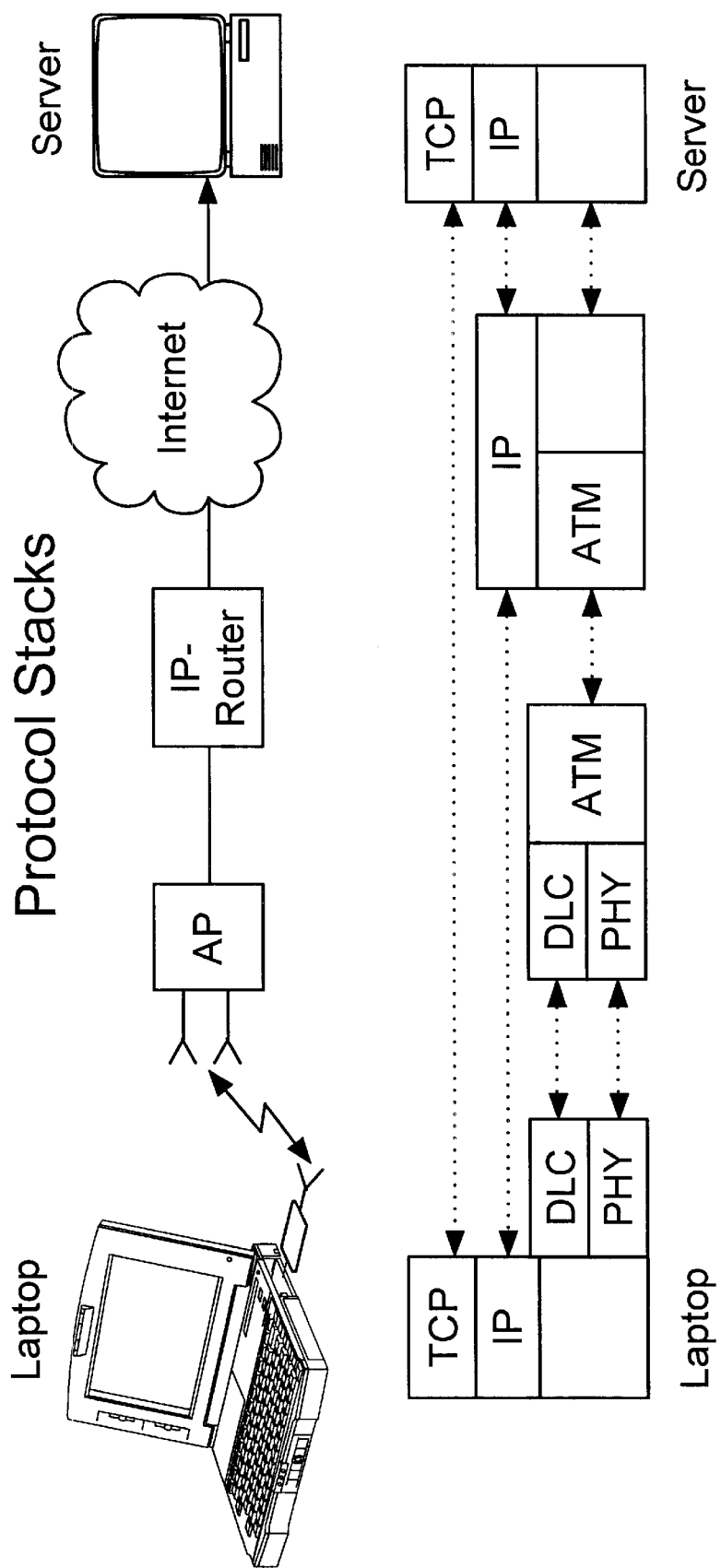
FIG. 7 shows protocol layers in a conventional system having a laptop computer communicating with a server via a wireless link between the laptop computer and an AP (Access Point), and an Internet connection between the server and an IP router connected to the AP.

FIG. 6 shows an example of how a DLC reshaper in accordance with exemplary embodiments of the invention successfully handles the situation shown in FIG. 5, where the network discards a packet. As shown in FIG. 6, a source forwards packets P1–P7 in a stream S61, wherein the packets are separated by a time interval T that is equal to 1/PR where PR is a packet rate. The packet rate can be, for example, a PCR (Peak Cell Rate) for the connection being supported. A network receives the stream S61, and outputs the packets in a stream S62 with variously different time intervals separating the packets. As shown, the network discards the packet P2, so that the stream S62 has packets P1 and P3 adjacent to each other. The stream S62 is provided to the DLC reshaper, which reshapes the stream S62 to create an output stream S63 that has the original time interval spacing of the stream S61.

In particular, the DLC reshaper compares the ARQ sequence numbers to determine whether any sequence numbers are missing, and to determine an appropriate interval between adjacent packets. In this exemplary case, the network clumps packets 1 and 3, but it happens to discard packet 2. The fact that ARQ sequence number 3 immediately follows ARQ sequence number 1 indicates to the DLC reshaper that packet 2 has been discarded. The DLC reshaper ensures that packet 3 is sent out 2*T seconds after packet 1.

In accordance with another embodiment of the invention, when the DLC reshaper receives the very first packet in a stream or sequence, it does not know whether the packet is early or late, i.e., a transfer delay of the packet is unknown. In a situation where the first packet arrives early at the DLC reshaper and the second packet arrives late, phase jitters in the output stream from the DLC reshaper can occur. In other words, the time between the first and second packet in the output stream from the DLC reshaper may become larger than the acceptable time interval of T seconds. To avoid this, the DLC reshaper can hold or delay the first packet for a time before transmitting as part of the output stream. The hold or delay time can be equal to a maximum CDV of the air interface of the WLAN, and can depend on a maximum number of allowed ARQ retransmissions and on an ARQ turn-around time. Alternatively, the DLC reshaper can hold or delay the first packet until it receives the second packet.

In summary, the DLC reshaper is tolerant of packet losses. By means of the ARQ sequence number, it can restore proper time intervals between packets despite possible packet losses. This can improve the performance of a synchronous application such as a Codec, which then can then cope with a packet loss by repeating the preceding packet or inserting background noise in the output stream in lieu of the lost packet. The DLC reshaper also provides an output packet stream that has constant phase despite possible packet losses, which reduces the risk of slippage occurring in the Codec.

The techniques described above using ARQ sequence numbers of packets to restore proper time intervals between packets in a stream can be used, for example, in any communication system that supports ARQ and requires constant time intervals between adjacent packets in a stream.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for restoring time intervals between data packets being transported in a LAN (Local Area Network) system having a DLC (Data Link Control) layer, comprising the steps of:

receiving at least one data packet from a source;

for each at least one received data packet, calculating a transmission time based on an ARQ (Automatic Repeat Request) sequence number of the received data packet and a peak PR (Packet Rate).

2. The method of claim 1, further comprising the step of:

sending the received data packet at the calculated transmission time.

3. The method of claim 1, wherein a transmission time $t_n$ of a received data packet having an ARQ sequence number n is calculated according to the expression $$t_n = t_k + (n-k)*T,$$

where k is the ARQ sequence number of a last transmitted data packet, $t_k$ is a transmission time of a previously transmitted data packet, and T is a time interval between adjacent data packets.

4. The method of claim 3, wherein $$T = 1/PR,$$

where

PR is a packet rate.

5. The method of claim 4, wherein PR is the peak packet rate.

6. The method of claim 1, further comprising the step of:

immediately transmitting a received data packet when a transmission time calculation for the received data packet is completed at or after a calculated transmission time for the received data packet.

7. The method of claim 1, wherein the LAN system is a WLAN (Wireless LAN) system.

8. The method of claim 1, further comprising the step of:

transmitting a first received data packet in a stream a predetermined amount of time after it is received.

9. The method of claim 8, wherein the predetermined amount of time is equal to a maximum CDV (Cell Delay Variation).

10. The method of claim 1, further comprising the step of:

transmitting a first received data packet after a second data packet is received.

11. The method of claim 1, wherein the DLC (Data Link Control) layer supports at least one of ATM (Asynchronous Transfer Mode) and IP (Internet Protocol) network protocols.

12. A LAN (Local Area Network) system having a DLC (Data Link Control) layer, comprising:

a DLC reshaper for calculating a transmission time for each data packet, based on an ARQ (Automatic Repeat Request) sequence number of the received data packet and a peak PR (Packet Rate).

13. The system of claim 12, wherein the LAN system is a WLAN (Wireless LAN) system.

14. The system of claim 12, wherein the DLC (Data Link Control) layer supports at least one of ATM (Asynchronous Transfer Mode) and IP (Internet Protocol) network protocols.

* * * * *